(12) United States Patent
Wu et al.

(10) Patent No.: US 8,861,540 B2
(45) Date of Patent: Oct. 14, 2014

(54) INDUSTRY-SPECIFIC COMMUNICATION FRAMEWORK

(75) Inventors: Benjamin Wu, Monmouth Junction, NJ (US); Bridget Elizabeth O'Connor, South Amboy, NJ (US); Hari Gopalkrishnan, Plainsboro, NJ (US)

(73) Assignee: Barclays Capital Inc., New York, NY (US)

( * ) Notice: Subject to any disclaimer, the term of this patent is extended or adjusted under 35 U.S.C. 154(b) by 290 days.

(21) Appl. No.: 11/711,128

(22) Filed: Feb. 27, 2007

(65) Prior Publication Data

US 2007/0203977 A1 Aug. 30, 2007

Related U.S. Application Data

(60) Provisional application No. 60/777,690, filed on Feb. 27, 2006.

(51) Int. Cl.
| | | |
|---|---|---|
| *H04L 12/28* | (2006.01) | |
| *H04L 12/58* | (2006.01) | |
| *H04L 29/08* | (2006.01) | |
| *H04M 7/00* | (2006.01) | |
| *H04L 29/06* | (2006.01) | |
| *H04M 1/2745* | (2006.01) | |
| *H04M 1/247* | (2006.01) | |

(52) U.S. Cl.
CPC ......... *H04L 67/306* (2013.01); *H04M 2201/42* (2013.01); *H04L 51/36* (2013.01); *H04L 67/28* (2013.01); *H04L 12/589* (2013.01); *H04M 7/0045* (2013.01); *H04L 65/105* (2013.01); *H04L 51/04* (2013.01); *H04M 1/27455* (2013.01); *H04M 1/2473* (2013.01); *H04L 67/2838* (2013.01); *H04L 12/581* (2013.01); *H04L 65/1069* (2013.01)
USPC ........... 370/420; 370/350; 370/389; 370/419; 455/403

(58) Field of Classification Search
USPC ................... 370/350, 389, 419, 420; 455/403
See application file for complete search history.

(56) References Cited

U.S. PATENT DOCUMENTS

| | | | |
|---|---|---|---|
| 7,120,136 B2 * | 10/2006 | Upp et al. | 370/331 |
| 2002/0120690 A1 * | 8/2002 | Block | 709/206 |

(Continued)

FOREIGN PATENT DOCUMENTS

| | | |
|---|---|---|
| EP | 1480422 | 11/2004 |
| JP | 10-262125 | 9/1998 |

(Continued)

OTHER PUBLICATIONS

Written Opinion of PCT/US2007/005075 dated Jul. 7, 2008, 5 pages.

(Continued)

*Primary Examiner* — Un C Cho
*Assistant Examiner* — Siming Liu
(74) *Attorney, Agent, or Firm* — Morgan Lewis & Bockius LLP

(57) ABSTRACT

A system includes a client device and a server including a communication module configured to be accessed by the client device through which a user of the client device connects to another user via one of a plurality of communication services connected to the server, wherein one of the plurality of communication services is telephony.

24 Claims, 17 Drawing Sheets

(56) References Cited

U.S. PATENT DOCUMENTS

| | | | |
|---|---|---|---|
| 2004/0049523 A1* | 3/2004 | Macholda | 707/201 |
| 2004/0068477 A1* | 4/2004 | Gilmour et al. | 707/1 |
| 2004/0109461 A1 | 6/2004 | Suzuki et al. | |
| 2004/0218609 A1* | 11/2004 | Foster et al. | 370/401 |
| 2004/0268265 A1* | 12/2004 | Berger | 715/752 |
| 2005/0078705 A1 | 4/2005 | Ito | |
| 2005/0130641 A1* | 6/2005 | Scott | 455/418 |
| 2005/0182767 A1* | 8/2005 | Shoemaker et al. | 707/10 |
| 2005/0210102 A1 | 9/2005 | Johnson et al. | |
| 2006/0074727 A1 | 4/2006 | Briere | |
| 2006/0168015 A1* | 7/2006 | Fowler | 709/206 |
| 2008/0086564 A1* | 4/2008 | Putman et al. | 709/227 |

FOREIGN PATENT DOCUMENTS

| | | |
|---|---|---|
| JP | 2002077445 | 3/2002 |
| JP | 2003298494 | 10/2003 |
| JP | 2004-186893 | 7/2004 |
| JP | 2004-214934 | 7/2004 |
| JP | 2004350291 | 12/2004 |
| JP | 2005-115738 | 4/2005 |
| JP | 2001-008267 | 1/2011 |
| WO | 2005089146 | 9/2005 |
| WO | 2005112409 | 11/2005 |

OTHER PUBLICATIONS

International Search Report of PCT/US2007/005075 dated Jul. 7, 2008, 5 pages.

International Preliminary Report on Patentability of PCT/US2007/005075 dated Sep. 2, 2008, 7 pages.

AU First Office Action dated Feb. 12, 2010 for Australian Application No. 2007557046, 9 pages.

JP First Office Action dated Feb. 8, 2011 for Japanese Application No. 2008-556478, 3 pages.

Publication of PCT/US2007/005075 dated Aug. 30, 2007, 40 pages.

Japanese Patent Application No. 2008-556478, Official Inquiry, dated Oct. 30, 2012, 9 pages.

Canadian Patent Application No. 2,644,681, Requisition by the Examiner, dated Aug. 1, 2012, 10 pages.

Japanese Patent Application No. 2008-556478, Appeal Decision, Jul. 9, 2013, 11 pages.

* cited by examiner

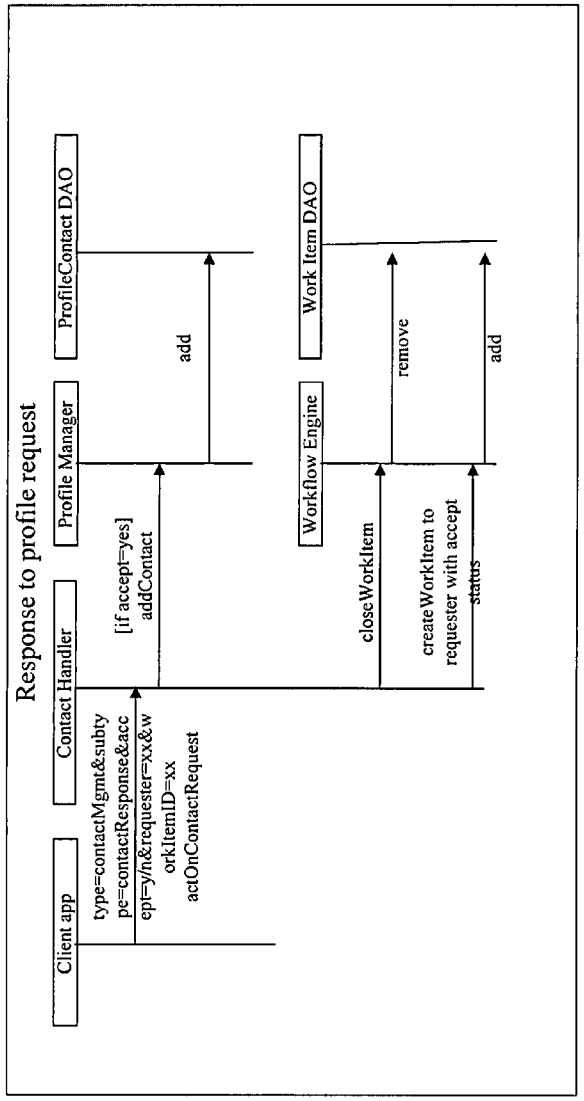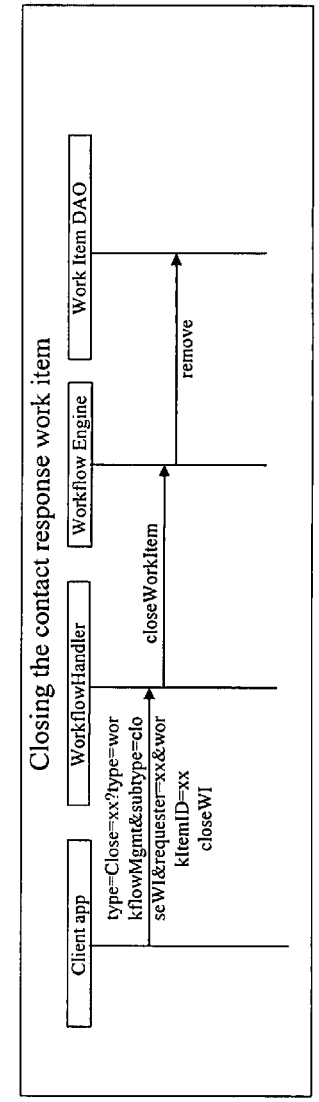
FIG. 8E
FIG. 8F

# US 8,861,540 B2

INDUSTRY-SPECIFIC COMMUNICATION FRAMEWORK

This application claims the benefit of the U.S. Provisional Patent Application No. 60/777,690 filed on Feb. 27, 2006, which is hereby incorporated by reference.

BACKGROUND OF THE INVENTION

1. Field of the Invention

The present invention relates to a system and method for a communications framework, and more particularly to a system and method for an integrated communications framework that integrates disparate communication modes onto a common platform.

2. Discussion of the Related Art

Until recently, general communications between individuals have been confined to the public switched telephone network ("PSTN"), also referred to as the plain old telephone system ("POTS"), as the main communication mode. With advancements in computer and wireless communication technologies, other forms of communication, such as electronic mail ("email") and instant messaging ("IM"), are now just as prevalent, if not more than the telephone. While many forms of communication may provide convenience to a user by providing different options, multiple forms of communication also mean the user must track the contact information for each type of communication mode separately. This is because each communication mode are disparate systems that require a separate user interface ("UI") for establishing the communication channel. For example, to make a telephone call, the user must use a telephone or a similar device (i.e., one that has a speaker and a microphone) connected to a PSTN and input a telephone number to make a connection to the other party. To send an email, the user must invoke an email application on a computing device connected to an email server and input an email address to send and receive emails. To send an instant text message, the user must have access to an IM device connected to an IM server and input an IM identifier to send and receive instant text messages.

Due to the disparate nature of each of these communication modes, managing contact information also becomes inefficient. In general, a typical user will have a telephone director, an email contact directory, and an instant messaging directory separately. While computer based contact applications consolidates the contact information onto a single format (e.g., electronic address books), these applications are typically only a "phone book" style application. In other words, the application only stores the contact information. The user must transfer the required information into the proper communication mode UI to initiate the communication. For example, a typical directory application on a personal computer ("PC") platform stores a person's contact information, such as phone number and email address. While some applications allow users to invoke an email application for even an IM application by clicking on the email or IM identifier displayed in the contact information, the user must punch in the telephone number, for example, into a telephone to initiate a telephone call.

With advancements in wireless device technology, many personal digital assistants ("PDAs"), cell phones, and pocket PCs have electronic contact lists built into the devices. Because these devices have telephony capabilities as well as text data capabilities, the user can initiate telephonic or text-based communications from these devices. However, these devices, while convenient, have limited computing capabilities because these devices are primarily for establishing communications. Accordingly, a user must have a separate device for computing purposes (e.g., PC) in addition to these communication devices. Moreover, these communication devices require specialized applications to be built into the devices. Accordingly, a contact list from one device cannot be transferred to a different device very easily.

Another recent attempt at integrating these communication modes onto a common platform has been based on voice-over-internet protocol ("VoIP") technology. VoIP devices convert analog voice signals into digitized data packets that are then sent over the Internet like any other data packets. Accordingly, a PC many be used as a telephone as well as the typical email and IM device. However, VoIP capability requires specialized applications as well as specialized hardware, in some cases. Moreover, each PC must be installed with the specialized software/hardware in order to implement such integration.

SUMMARY OF THE INVENTION

Accordingly, the present invention is directed to a system and method for an integrated communication framework that substantially obviates one or more problems due to limitations and disadvantages of the related art.

An object of the present invention is to provide a system and method that integrates disparate communication modes onto a common platform.

Another object of the present invention is to provide a system and method that integrates disparate communication modes onto a common platform, such as a web browser.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes a client device and a server including a communication module configured to be accessed by the client device through which a user of the client device connects to another user via one of a plurality of communication services connected to the server, wherein one of the plurality of communication services is telephony.

In another aspect, a communication module includes a contact list module to manage a list of contact items, each of the contact items including at least one command object, a telephony module to establish a telephonic connection, and an instant messaging module to establish an instant messaging session, wherein the command object is associated with one of the telephony module and the instant messaging module.

In yet another aspect, a method includes the steps of establishing a connection between a client device and a communication module on a server, displaying a list of contact items, each of the contact items including a profile and at least one command object, the command object being associated with one of a plurality of communication services including telephony, and establishing a communication connection between a user of the client device and an owner of the profile associated with the contact through the communication service associated with the command object.

In yet a further aspect, a computer program product including a computer readable medium having stored thereon computer executable instructions that, when executed by a general purpose computer, directs the computer to perform a method comprising the steps of establishing a connection between a client device and a communication module on a server, displaying a list of one or more contact items, one or more of the contact items each including a profile and at least one command object, the command object being associated with one of a plurality of communication services including telephony, and establishing a communication connection between a user of the client device and an owner of the profile associated with one of the contact items through the communication service associated with the command object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 7A is a view of an exemplary user interface for adding contacts in accordance with the present invention;

FIGS. 8A and 8B are views of an exemplary user interface for viewing and processing work items in accordance with the present invention;

FIGS. 8C-8F are flow diagrams illustrating exemplary processes related to viewing and processing work items in accordance with the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
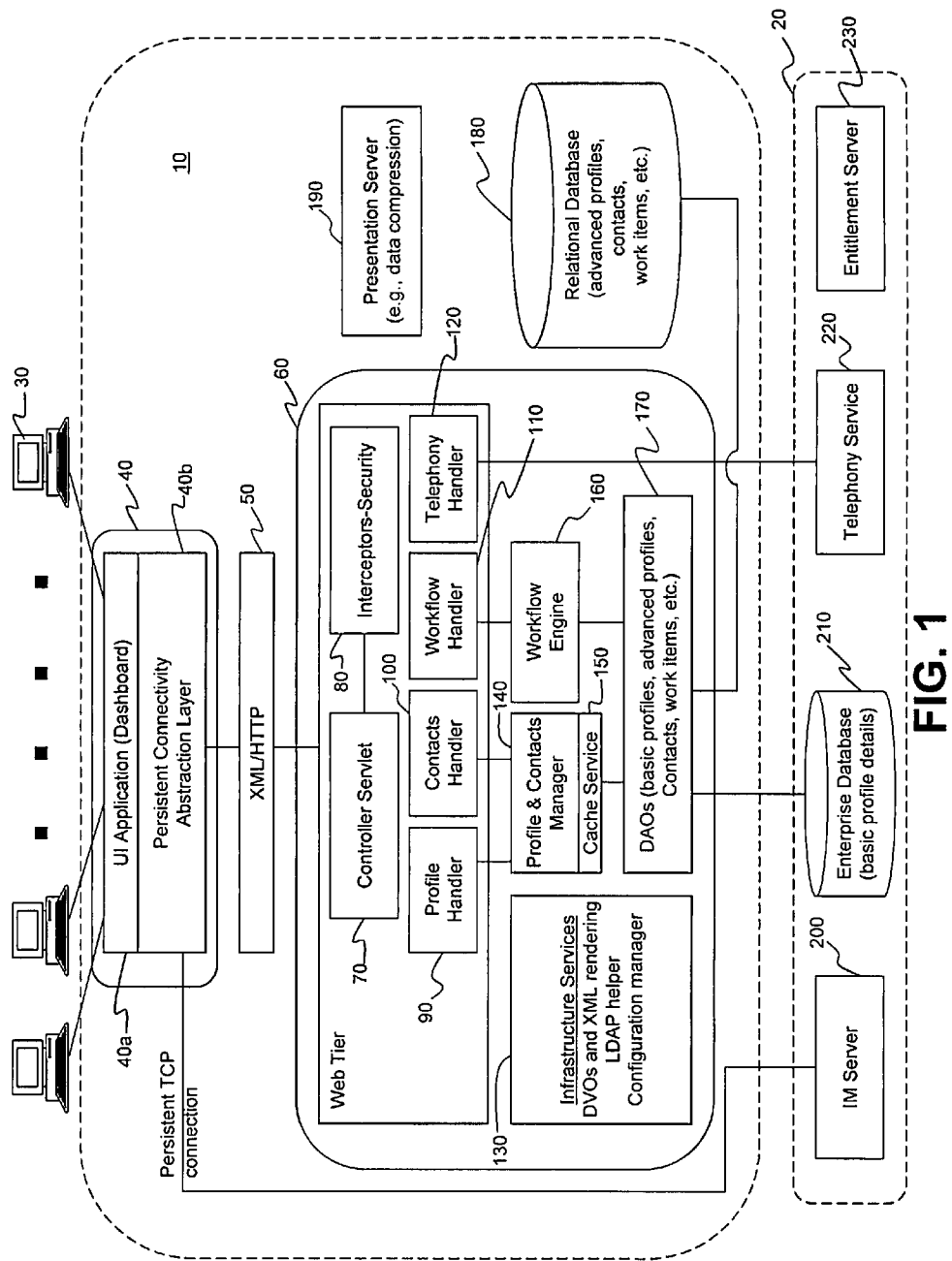
FIG. 1 is a block diagram illustrating an overview of an exemplary embodiment of the present invention.

In accordance with the present invention, an integrated communications framework is provided that allows a user to access disparate communication modes through a common platform on a user's computer. As shown in FIG. 1, the system for the integrated communications framework in accordance with an exemplary embodiment of the present invention includes a communication integration server 10, communication enterprise 20, and client devices 30. As a general overview, the details of which are described below, users access the integrated communications framework through their client devices 30 by connecting to the interface module 40 hosted on the communication integration server 10. The interface module 40 includes a UI application module 40a that displays a graphical user interface (herein referred to as a "dashboard") on the client device 30. The interface module 40 also includes a persistent connectivity abstraction layer 40b that maintains a persistent connection with an IM server 200 in order to continually receive presence information from the IM server 200 so as to indicate the users logged onto the IM server 200. The interface module 40 connects to the integration module 60 that integrates various communication modes onto a common platform (i.e., the dashboard) through data channel 50. As an example, the data channel 50 may be implemented using XML (extended markup language) and HTTP (hypertext transfer protocol) platform. However, other data platforms may be used without departing from the scope of the present invention.

The integration module 60 includes a controller module 70 that, among other things, delegates processing to various handlers based on the request type from the interface module 40. In an exemplary embodiment, the handlers include profile handler 90, contacts handler 100, workflow handler 110, and telephony handler 120. Other handlers may be included without departing from the scope of the present invention. The integration module 60 also includes security module 80 that, among other things, function to intercept common functions, such as a authentication during user login process, for example. The profile handler 90 and contacts handler 100 interact with profile and contacts manager 140 to create, view, and modify user profile and contact information. To make the data processing more efficient, cache service 150 may be included to allow faster access to the profile and contacts data. The workflow handler 110 interacts with the workflow engine 160 to manage the requests and workflow of the processes. A telephony hander 120 interacts with a telephony service 220 to establish a telephone connection between parties.

The integration module 60 further includes an infrastructure services module 130 that provides generic database objects (e.g., DVOs) to facilitate XML rendering, for example, configuration manager, and data access protocols (e.g., LDAP) to process the data and display the information to the user's client devices 30 properly. The integration module 60 also includes database object module 170 connected to a relational database 180 for storing and retrieving profiles, contacts, work items, and the like, to be further explained in detail below. Other processing related to presentation of the data on the client devices 30 are handled by presentation server 190.

The communication integration server 10 connects to various communication services provided by a communication enterprise 20. In the exemplary embodiment, the communication enterprise 20 in accordance with the present invention includes an enterprise's IM server 200, enterprise database 210, telephony service 220, and an entitlement server 230. In general, the IM server 200 refers to the enterprise's instant text messaging service, the telephony service 220 refers to the enterprise's telephonic services, and the enterprise database 210 provides basic information about the user of the enterprise. Entitlement server 230 provides authentication/authorization information and function by determining the entitlements assigned to each of the users who are authorized to log into the communication integration server 10. The details of the various modules and functionalities in accordance with an exemplary embodiment of the present invention will be described below.

A user accesses the communication integration server 10 via a client device 30. For example, client device 30 may be a personal computer, or any other computing device. The client device 30 connects to the communication integration server 10 through a network, such as a local area network (LAN) or the Internet. However, other connections, such as a direct connection via modem or physical cable, may be used without departing from the scope of the invention.

Figure 2:
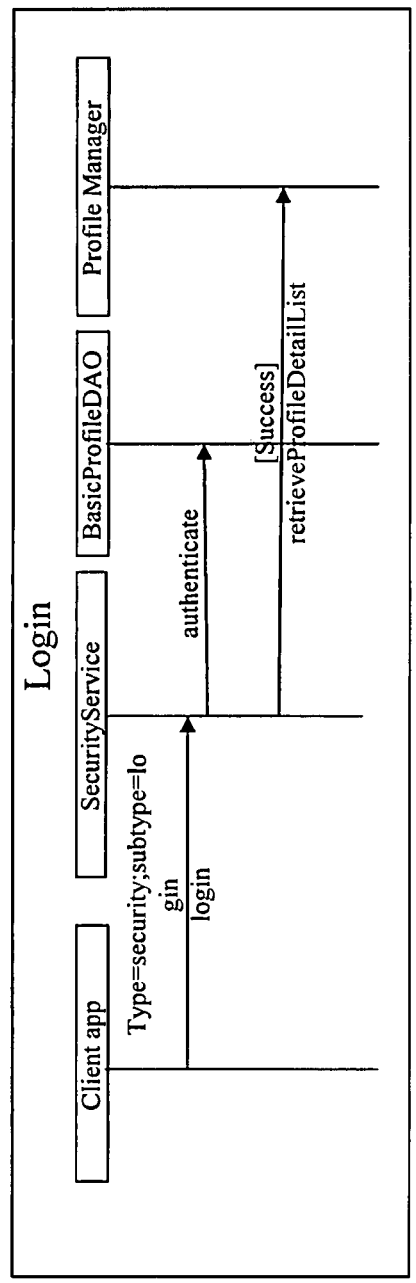
FIG. 2 is a flow diagram illustrating an exemplary login process in accordance with the present invention.

Once a connection has been established between the communication integration server 10 and the client device 30, the user must log into the communication integration server 10. When the user presents the login data (e.g., user ID, password), the user's identity is authenticated by the security module 80. In particular, the security module 80 transmits and receives information from the entitlement server 230 on the communication enterprise 20. The entitlement server 230 identifies the user and the associated level of access to determine the type and amount of information and functionality to be made available on the communication integration server 10. Once the user has been authenticated and authorized, the interface module 40 displays a user interface (i.e., the dashboard) on the client device 30. FIG. 2 illustrates an exemplary login process in accordance with the present invention.

Figure 3:
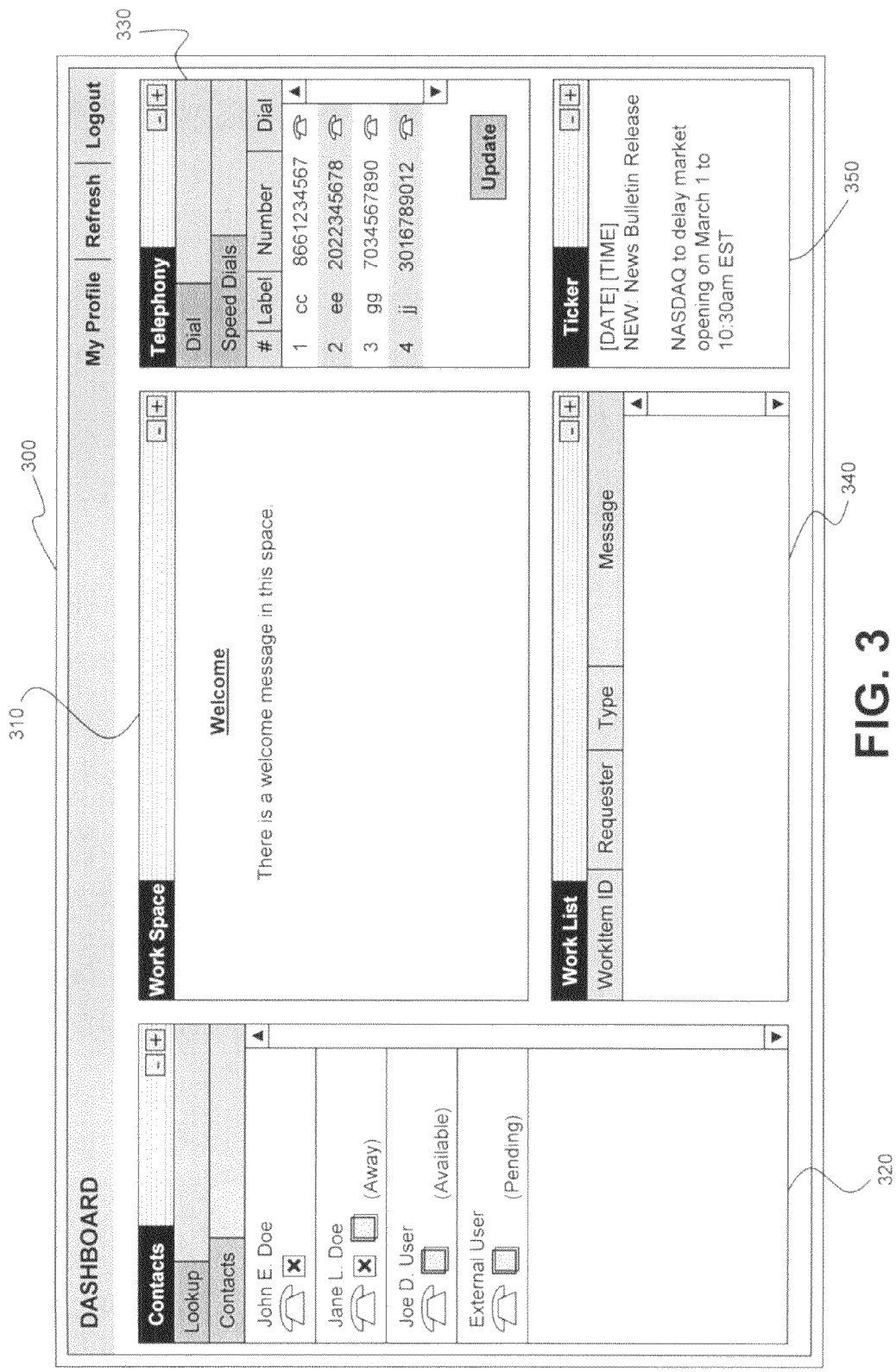
FIG. 3 is a view of an exemplary user interface in accordance with the present invention.

FIG. 3 illustrates an exemplary view of a dashboard 300 in accordance with the present invention. As shown in FIG. 3, the dashboard 300 may be divided into various sections for displaying different information. In the exemplary embodiment of FIG. 3, the dashboard 300 is shown with a work space section 310, contact list section 320, telephony section 330, work list section 340, and ticker section 350. It is to be understood that the dashboard 300 may be arranged differently and having sections showing other types of information without departing from the scope of the present invention. The dashboard 300 is displayed through a web-browser type application on the client device 30. All services and functionality are performed by the interface module 40 so that no special software is needed on the client device 30. The dashboard 300 may be arranged and displayed in the form of an Internet or Intranet portal for convenience. However, other arrangements and/or interface may be used without departing from the scope of the present invention.

In general, work space section 310 is the main UI section for viewing and performing various functions of the present invention. Contact list section 320 displays the user's contact list and includes command objects to perform various functions, such as initiating phone calls, initiating IM communications, and searching an electronic directory of all the users registered on the system. The telephony section 330 provides a list of speed dials as well as command objects to initiate telephone calls between different parties. Work list section 340 displays a list of pending work items to be acted on by the user. Ticker section 350 displays various news and information items that are of interest to the user.

Figure 4A:
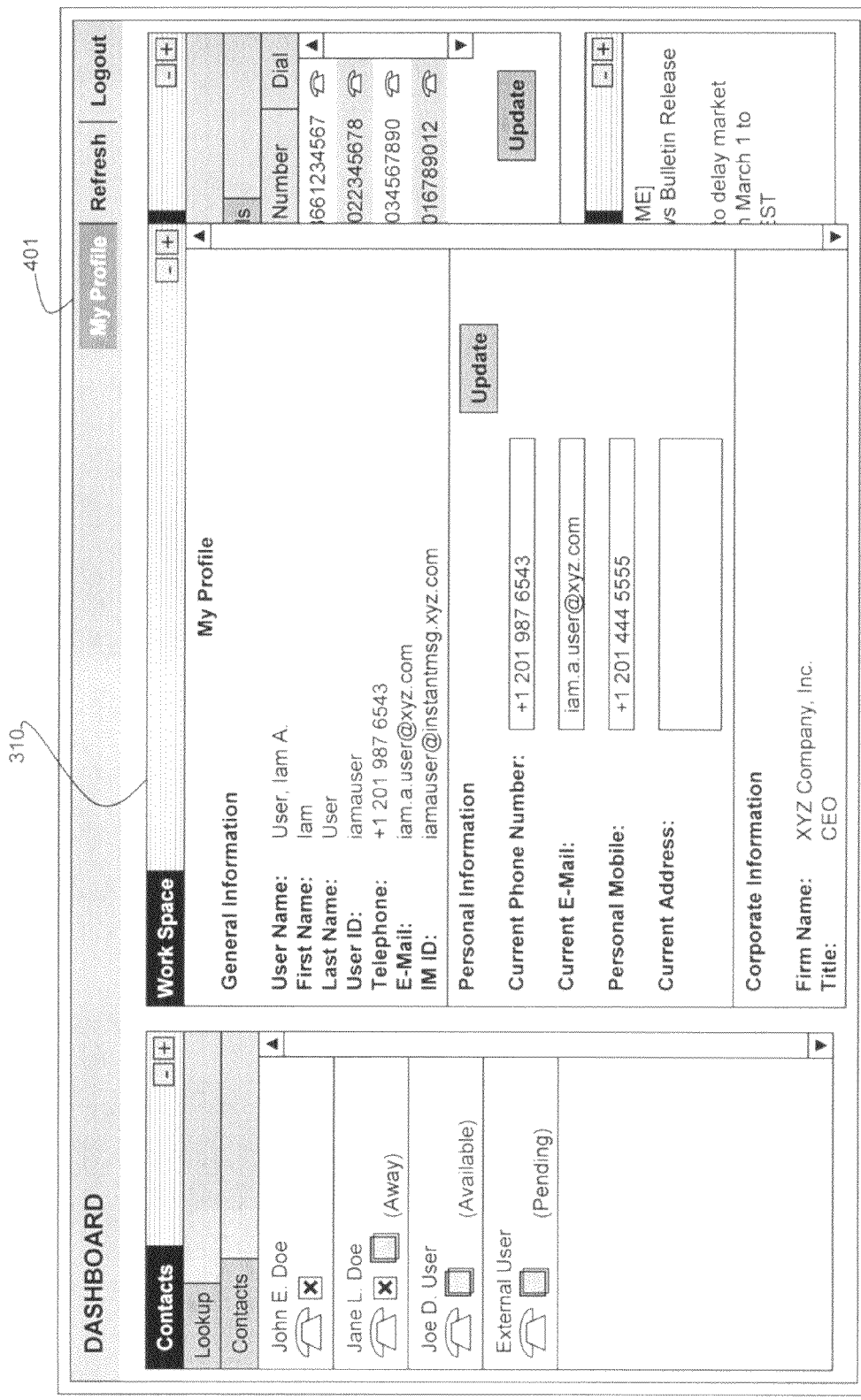
FIG. 4A is a view of an exemplary user interface for displaying a profile in accordance with the present invention
Figure 4B:
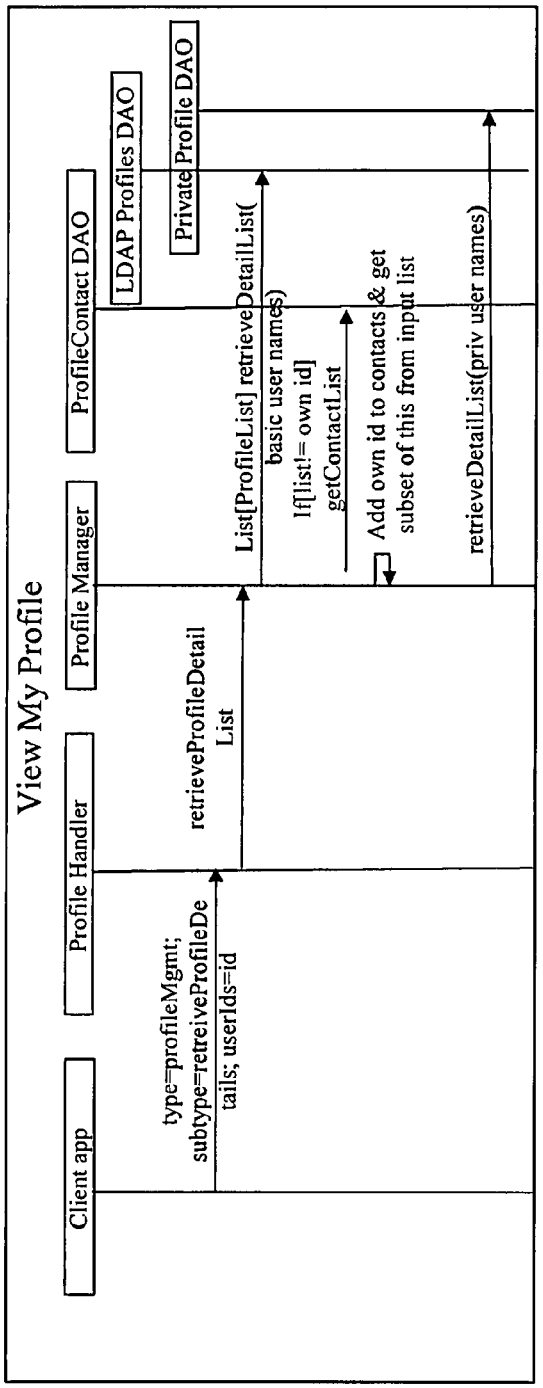
FIGS. 4B and 4C are flow diagrams illustrating exemplary processes for viewing and setting profiles in accordance with the present invention.
Figure 4C:
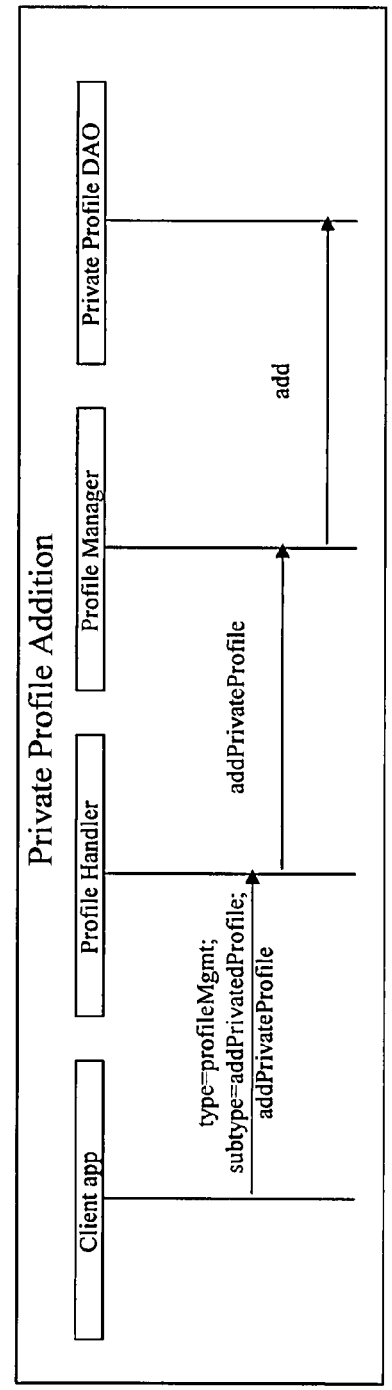

FIG. 4A illustrates an exemplary embodiment of viewing and modifying the user's profile information. When the user accesses the dashboard for the first time, the information displayed is based on the basic profile of the user based on the information obtained from the entitlement server 230 during login. Accordingly, the user may view and modify his or her profile information. In particular, the user may invoke the user's profile by selecting (e.g., clicking) on the "My Profile" button 401. In response, the user's profile information is displayed in the work space section 310. Each of the different sections of the dashboard may be resized so that the information may be viewed more conveniently as shown in FIG. 4A. Various sections of the user's profile may be added, deleted, or modified to provide personal details, also referred to as "private" profile (e.g., name, personal address, personal phone numbers, etc.) as well as other pertinent information and preferences, such as the user's business information (e.g., company name, title/position, business phone number, etc.). In the exemplary embodiment of the present invention, the basic (i.e., public) profile comes from the data stored in the enterprise database 210. That is to say, the basic (i.e., public) profile includes data used in registering with the enterprise system (e.g., name, user ID, office phone number, department/position title, function, etc.) that is publicly known to other users of the system. Accordingly, any information not required to register with the enterprise system may be designated as private profile, which is stored and managed on the relational database 180 of the communication integration server 10. However, the other types of data may be designated as public/private and different levels of permissions for access to the profile may be set without departing from the scope of the present invention. FIGS. 4B and 4C illustrate exemplary embodiments of the processes for viewing and setting the user's profile information.

Figure 5A:
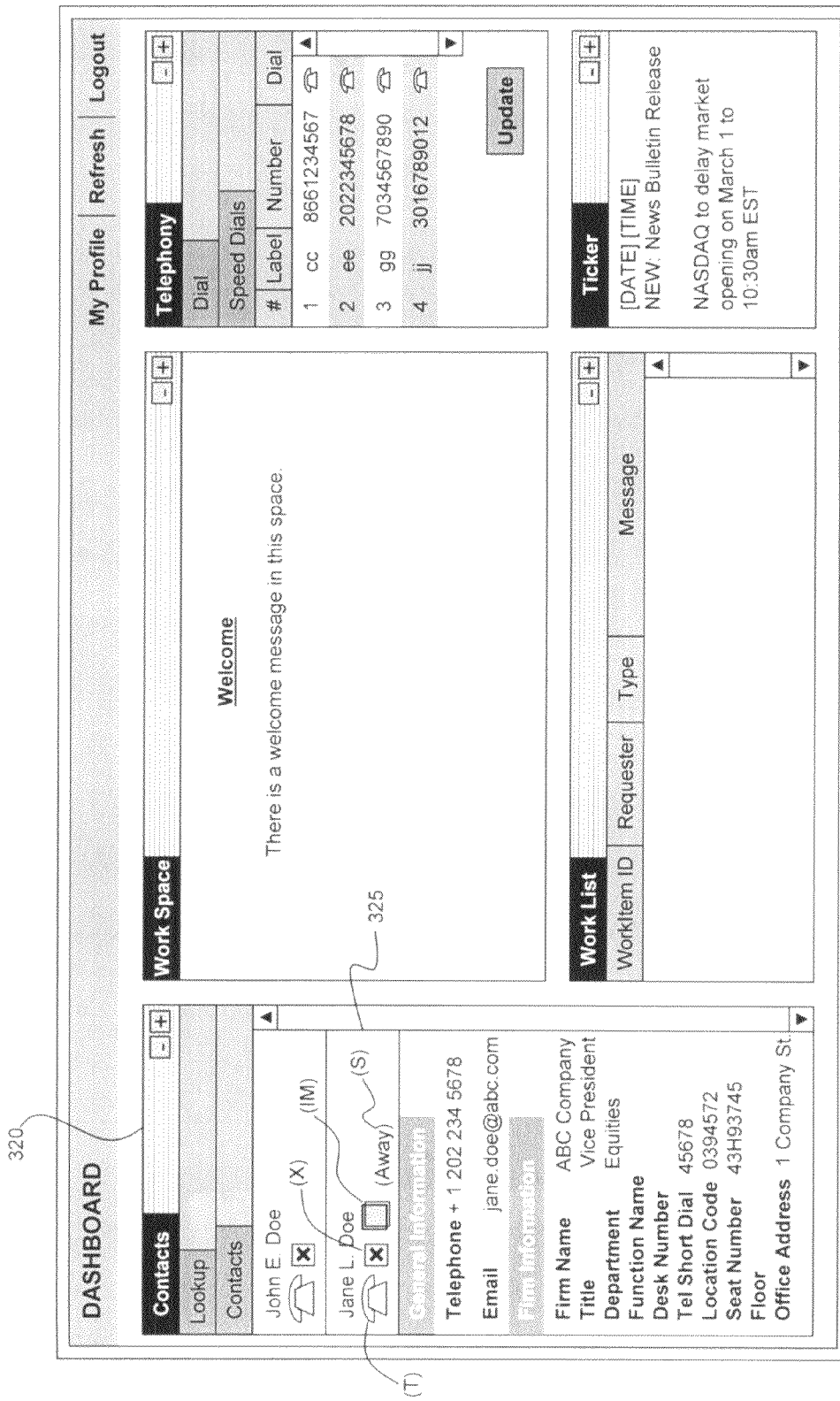
FIG. 5A is a view of an exemplary user interface for displaying contact list in accordance with the present invention.

FIG. 5A illustrates an exemplary embodiment of a profile viewable in the contact list section 320. Contact management is performed by adding, modifying, deleting contact items 325 into the user's contact list section 320. Each contact item 325 includes the contact person's name and a list of command object for performing various functions related to the contact item 325. In the exemplary embodiment shown in FIG. 5, each contact item 325 may include a command object for initiating a phone call (T), deleting the contact item (X), and initiating an IM session (IM). The command objects available for a contact item depend on the profile of the person associated to the contact item. For instance, in the exemplary embodiment shown in FIG. 5A, the contact item for "John E. Doe" only has command objects (T) and (X) because either John Doe does not have an IM handle or John Doe has not given permission for the user to have access to that information (i.e., the IM handle is a private profile item). On the other hand, the contact item for "Jane L. Doe" includes the command objects (T), (X), and (IM). Because the command object (IM) is available for Jane Doe, the contact item also includes presence status identifier (S) to indicate whether the person is logged into the IM server 200.

Figure 5B:
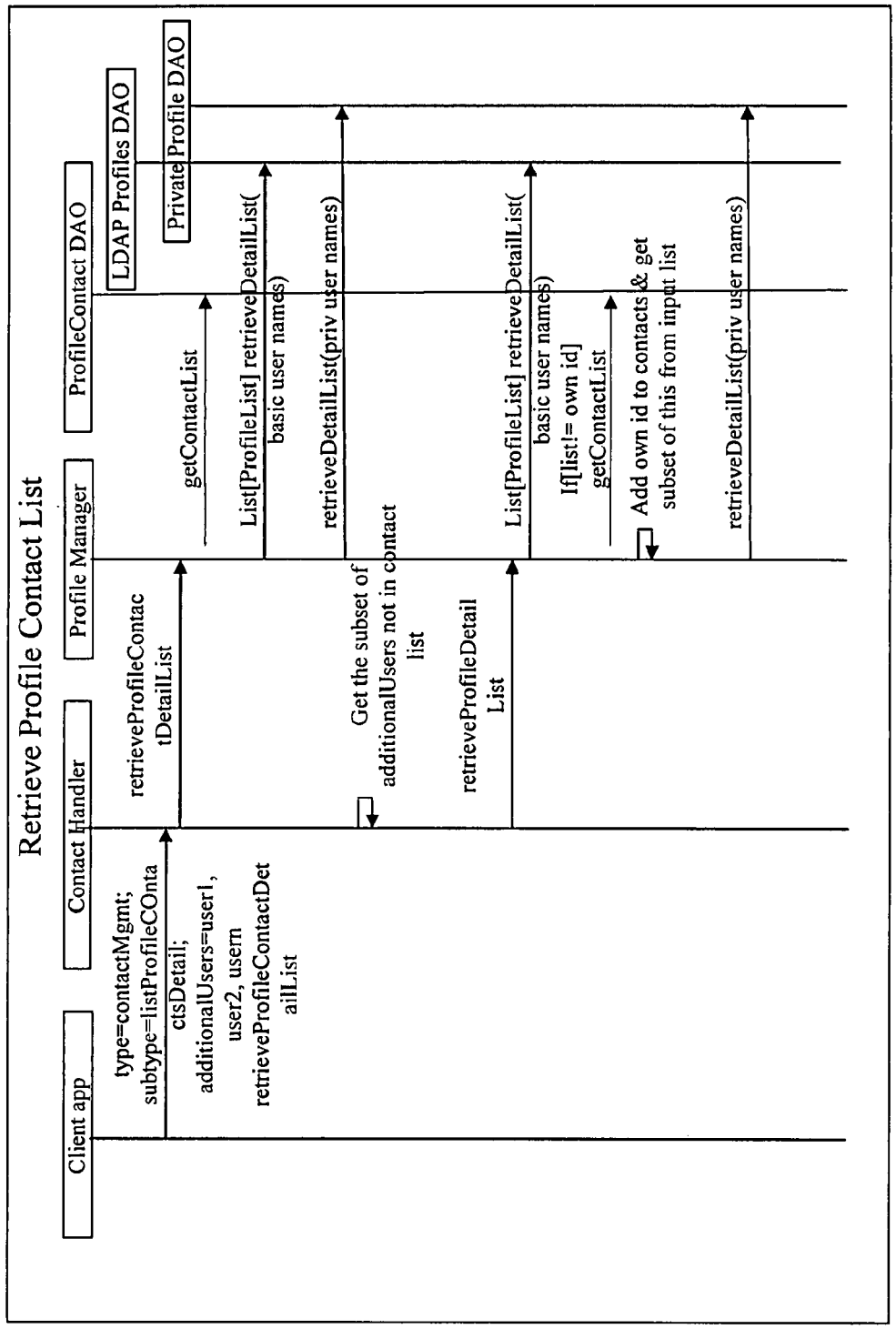
FIG. 5B is a flow diagram illustrating an exemplary process for retrieving contact list profiles in accordance with the present invention.

Each contact item 325 is linked to the available profile of the person in the contact list section 320 and may be viewed by selecting the contact item. For example, as shown in FIG. 5, when a user selects a contact item 325 to view (e.g., Jane L. Doe), the contact item expands to display the person's basic profile (i.e., public profile) as well as any authorized private profile. It is to be understood that the public/private profile information of a selected contact item may be displayed in other sections of the dashboard (e.g., in the work space section 310) and in different views (e.g., a new pop-up window) without departing from the scope of the present invention. All of contact items 325 displays a basic (i.e., public) profile. However, as it will be explained further below, a specific request and approval process must be used in order to gain access to the contact's private profile. FIG. 5B illustrates an exemplary process for retrieving the profile contact list.

Figure 6A:
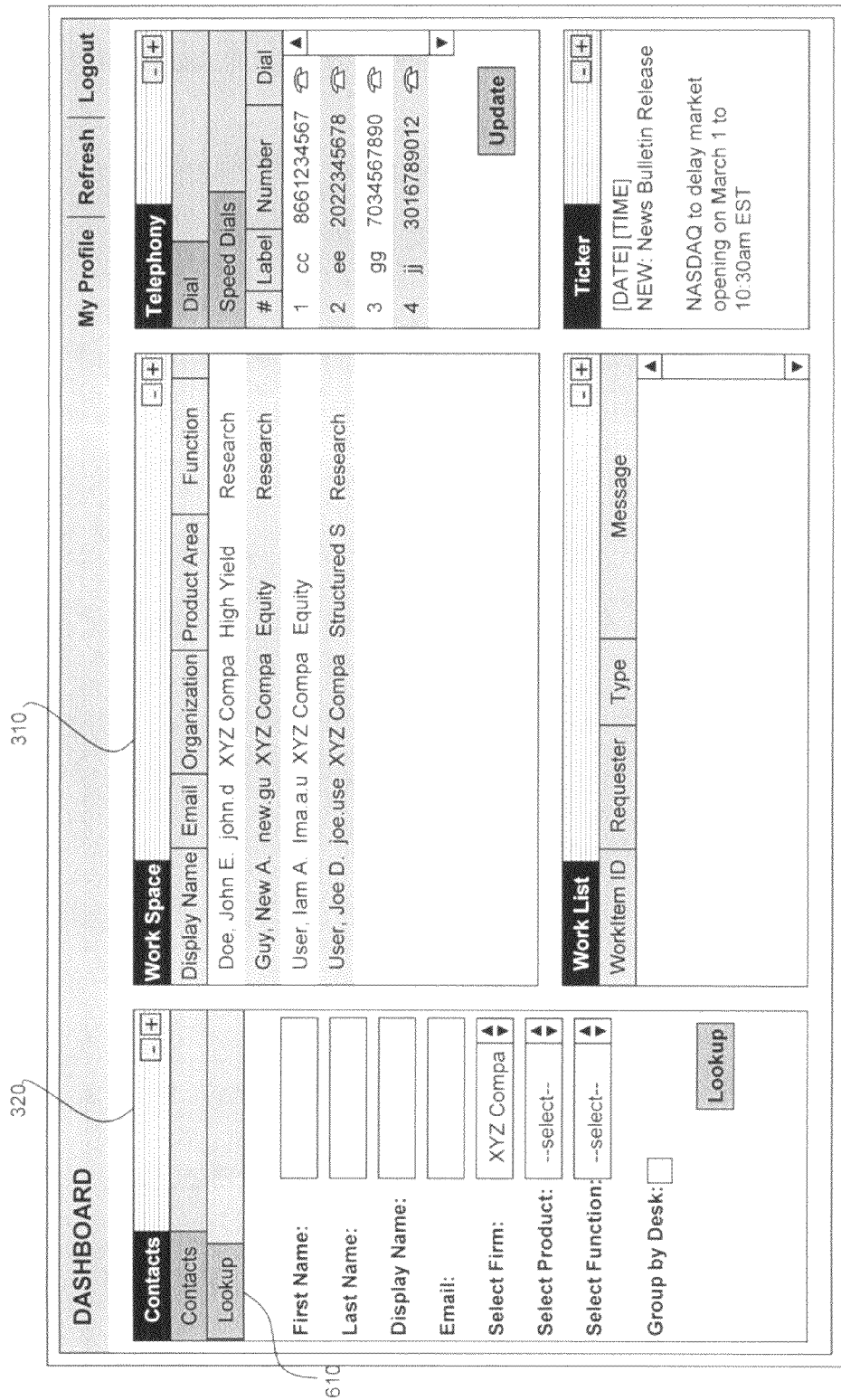
FIG. 6A is a view of an exemplary user interface for searching profiles in accordance with the present invention.

The contact list section 320 also includes a search engine 610 to look up the profiles of other users registered on the system. FIG. 6A illustrates an exemplary embodiment of a look up feature in accordance with the present invention. The search engine 610 searches for the profiles matching any or all of the search parameters entered into the search engine 610. For example, a profile may be searched by first name, last name, user name (e.g., user ID), email, firm name, product, or job function. In the exemplary embodiment shown in FIG. 6A, the firm name, product, and job function parameters are entered by selecting an item from a drop-down menu. However, it is to be understood that any type of input interface for any other parameters in any combination may be used without departing from the scope of the invention.

The search engine 610 searches for matching parameters in the enterprise database 210 as well as the relational database 180 of the communication integration server 10. The enterprise database 210 contains all the users who are part of the enterprise while the relational database 180 contains items related to the communication integration server 180. For example, an enterprise user who has not set up an account on the communication integration server 10 may be found using the search engine 610 and may be added to the user's contact list section 320 at which time, the enterprise user's profile will also become a database object in the relationship database 180 of the communication integration server 10. While the exemplary embodiment is configured such that the communication integration server 10 may be integrated into an existing enterprise system, the profiles may be stored in any number of databases without departing from the scope of the present invention.

Figure 6B:
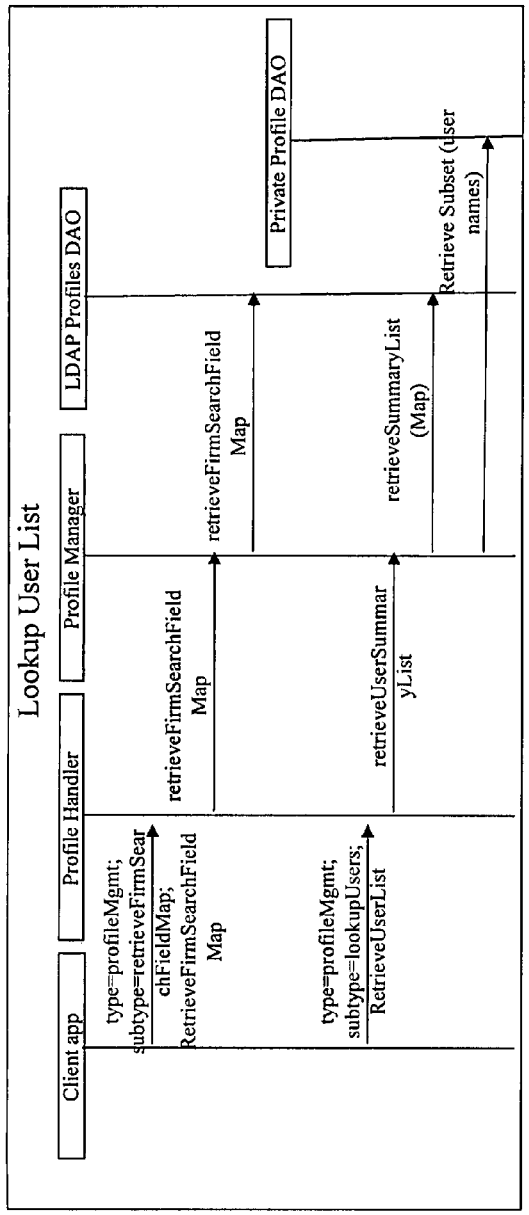
FIGS. 6B and 6C are flow diagrams illustrating exemplary processes for searching and viewing profiles in accordance with the present invention.
Figure 6C:
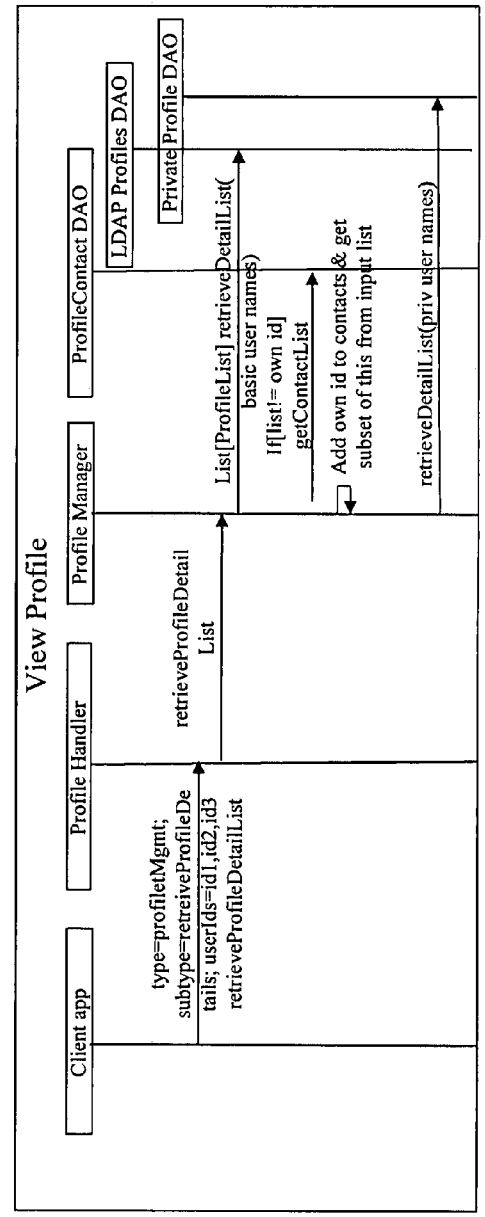

The results of the search from the search engine 610 are displayed in the work space section 310. As discussed above, the search results may be displayed in other sections in other views without departing from the scope of the invention. The user may select a search result item to view the detail profile of the person in the search result. The profile may be displayed in a similar manner as shown in FIG. 4A with the exception of the ability to modify any of the profile information. As briefly discussed above, the user cannot view any private profile information without first obtaining permission from the owner of the profile. Accordingly, the profile displayed from the search result is basic (i.e., public) profile information only unless permission has already been acquired. While the search engine 610 shown as a component of the contact list section 320, it is to be understood that the search engine 610 may be displayed and invoked in other sections and/or views without departing from the scope of the present invention. FIGS. 6B and 6C illustrate exemplary processes for looking up a profile and viewing a profile from the result list, respectively.

Figure 7A:
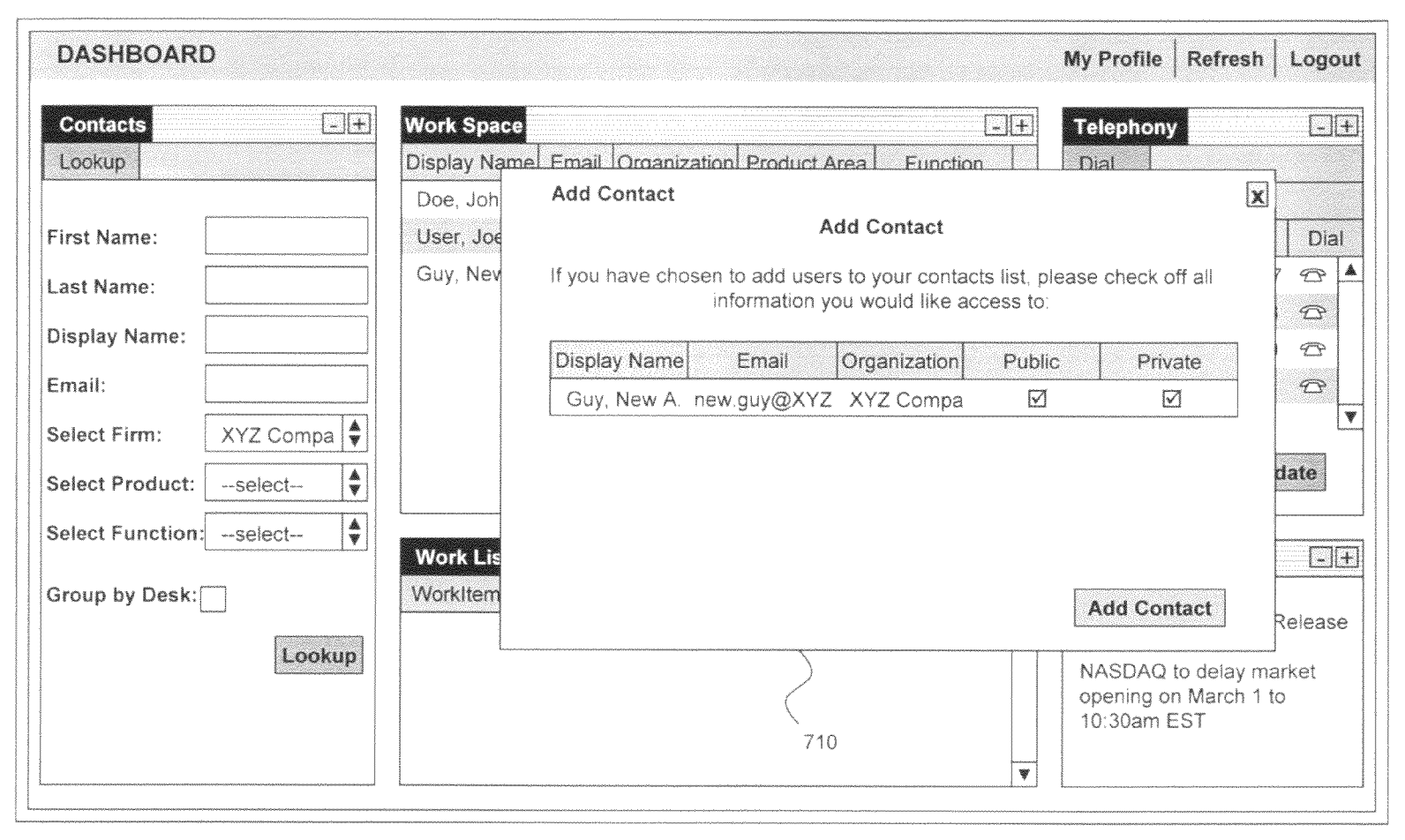
Figure 7B:
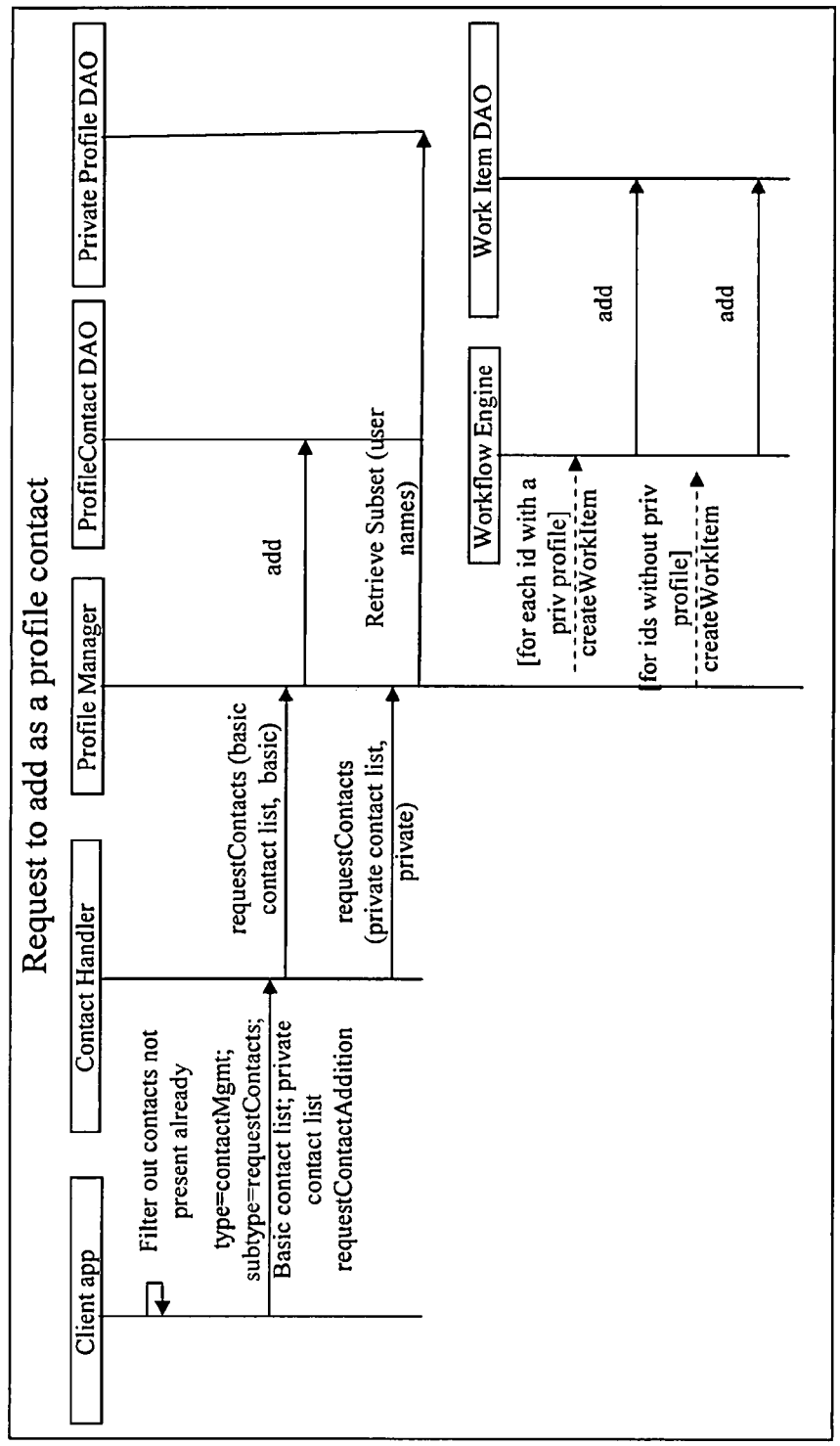
FIG. 7B is a flow diagram illustrating an exemplary process for adding contacts in accordance with the present invention.

In order to add a contact item to the contact list section 320, a command object from the search result (not shown) is activated to add the selected contact into the contact list section 320 as a contact item 325. FIG. 7A illustrates an exemplary embodiment for adding a contact item to the contact list section 320. As shown, the selected contact (e.g., "New A. Guy") is displayed in an add contact window 710. The contact items to be created in the contact list section 320 are displayed with command items for adding the public and private profiles of the selected contact. If the "private" profile is to be added, a request for permission to gain access to the private profile is generated and sent to the profile owner as a work item, the details of which are discussed below. FIG. 7B illustrates an exemplary process for adding a contact item.

Figure 8A:
Figure 8B:
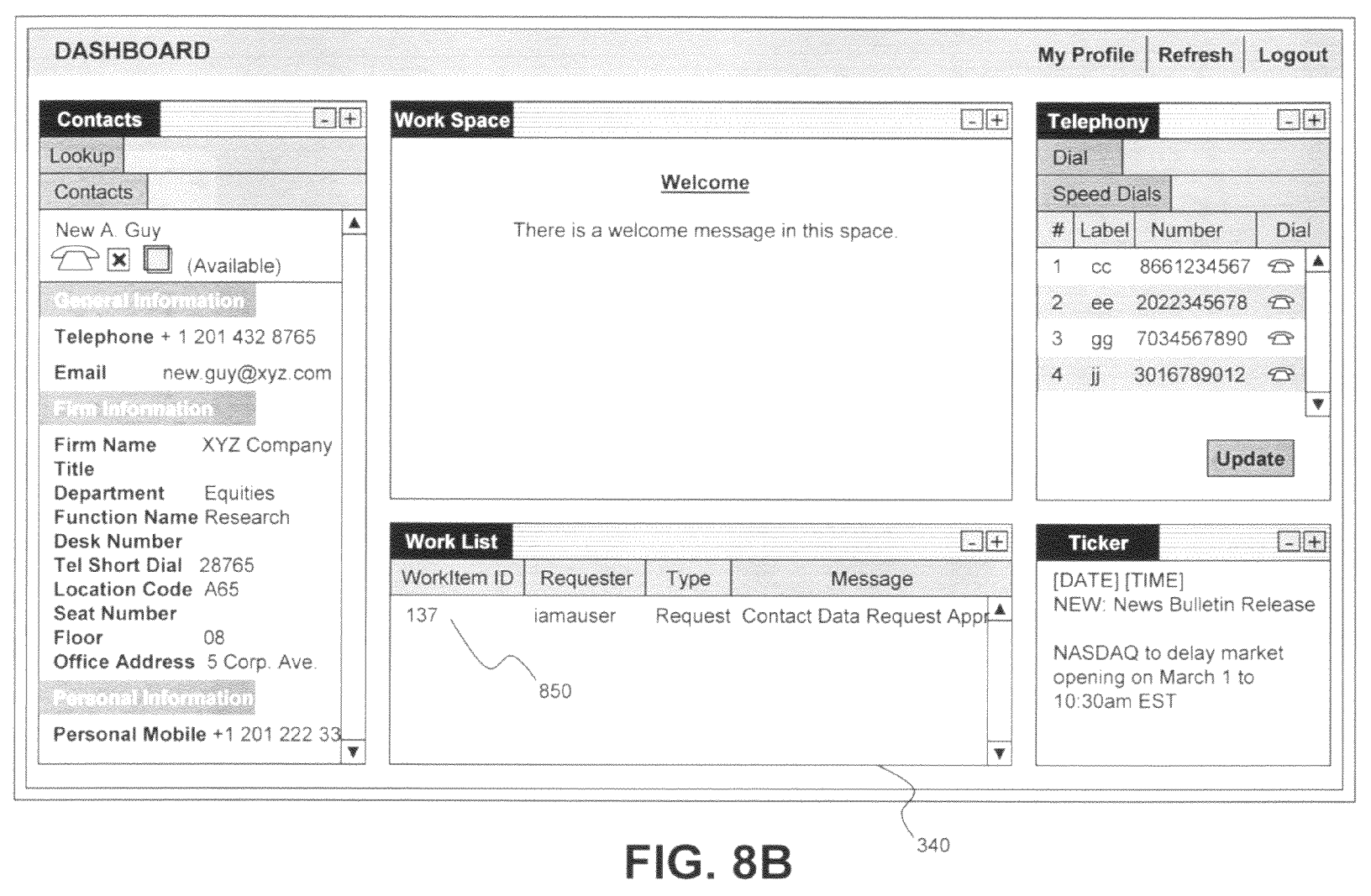
Figure 8C:
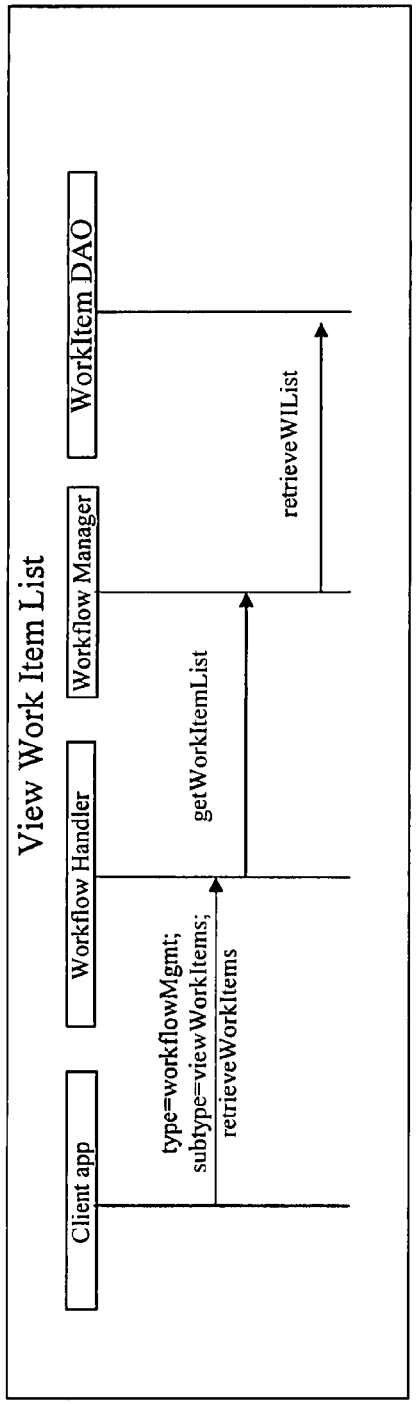
Figure 8D:
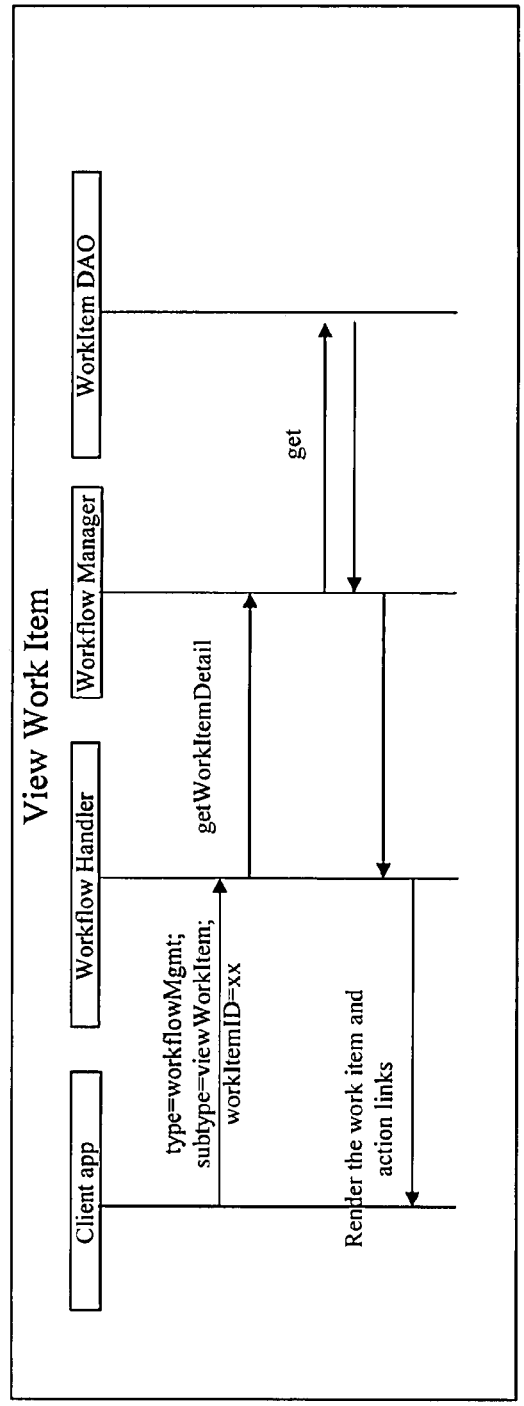

FIG. 8A illustrates an exemplary embodiment for accessing work items. As shown in FIG. 8A, when a user has requested access to the private profile of another user, a work item 810 is generated and sent to the owner of the profile. Work items needing attention are displayed in the work list section 340 of the dashboard when the owner of the profile logs into the communication integration server 10. In the example above, when the user adds the profile of "New A. Guy" (FIG. 7A) with the request for access to the private profile, a work item 810 is generated and sent to the owner of the profile (i.e., New Guy). As shown in FIG. 8, when the owner of the requested profile logs into the communication integration server 10, the work item 810 is displayed in the work list section 340 as a pending work item needing action. When the owner of the profile selects the work item 810, a detail view 820 of the work item is displayed. The detail view 820 includes command objects "Accept" (830) and "Reject" (840).

As shown in FIG. 8B, once the owner makes a decision (i.e., selects either "Accept" or "Reject"), a work item 850 is generated and sent to the requestor's work list section 340. For example, if the owner of the profile rejects the request, the work item 850 indicates that the request has been denied. Accordingly, the requestor will not be able to view the private profile. On the other hand, if the owner accepts the request, the work item 850 indicates that the request has been approved. Accordingly, the requester will be able to view the private profiles in the contact list section 320 when the requestor selects the contact item 325 associated with the profile owner. All of these changes are updated in the relational database 180. FIGS. 8C-8F illustrate exemplary processes related to generating, viewing, and acting on the work items generated from a profile add request.

Figure 9:
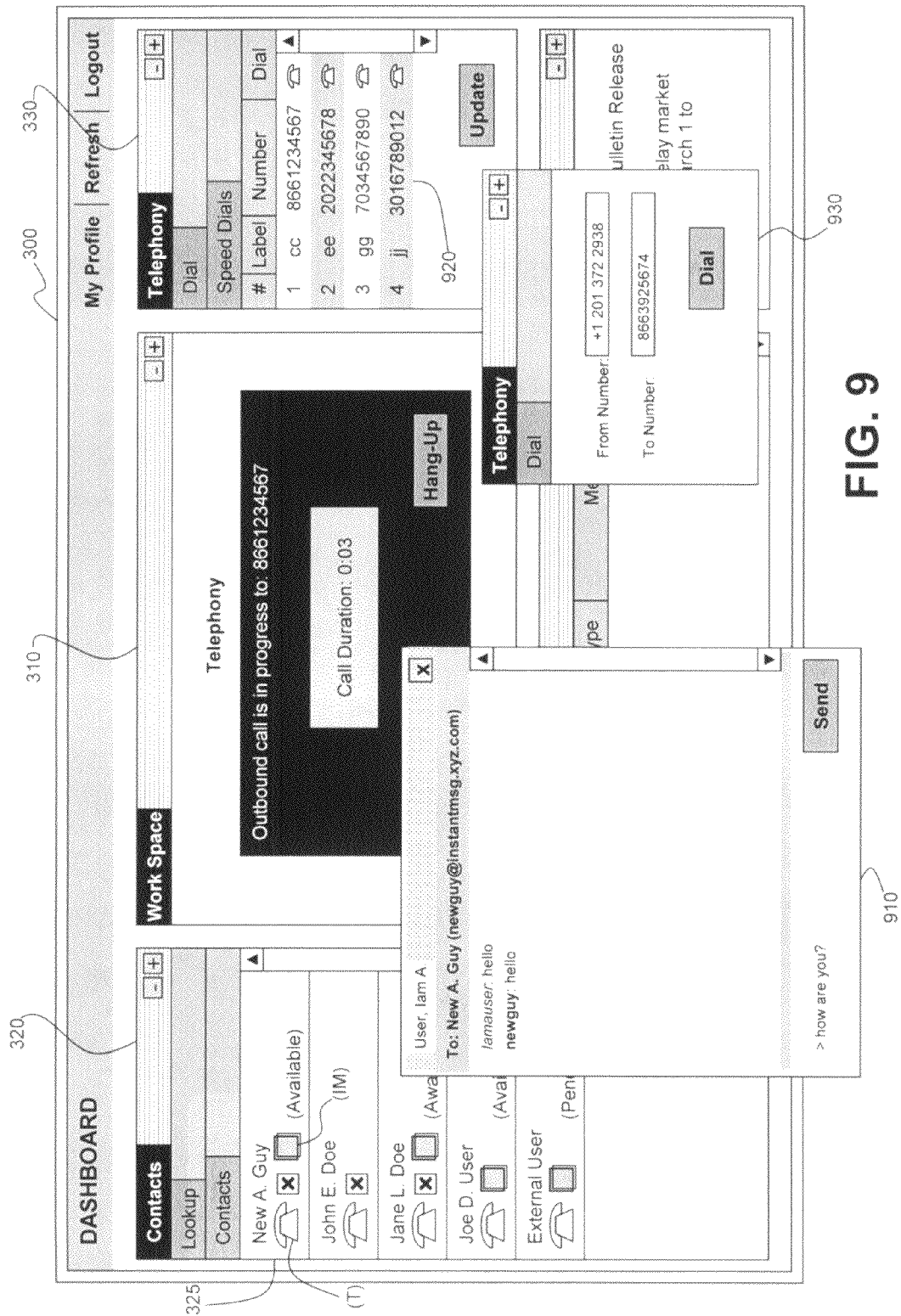
FIG. 9 is a view of an exemplary user interface for communicating in accordance with the present invention.
Figure 10:
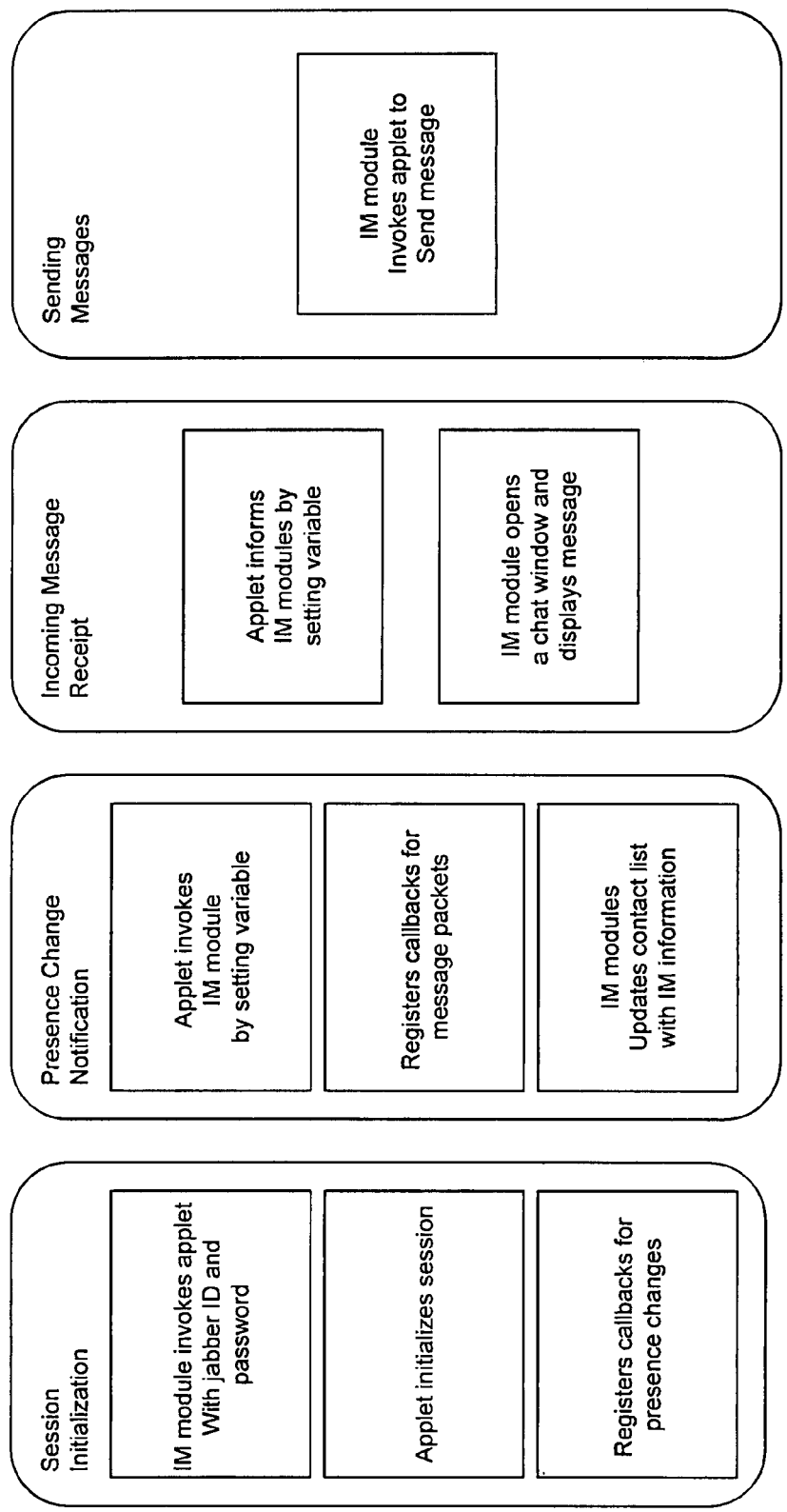
FIG. 10 is a block diagram illustrating an exemplary process for IM sessions in accordance with the present invention.

FIG. 9 illustrates an exemplary embodiment of establishing various communications in accordance with the present invention. As shown in FIG. 9, a user may initiate IM sessions 910 by selecting the command object (IM) in the contact item 325 from the contact list section 320. In the exemplary embodiment, the activation of (IM) command object establishes an IM session via the IM server 200. FIG. 10 illustrates an exemplary embodiment of the process of establishing an IM session in accordance with the present invention. Similarly, a telephone call may be established by selecting the command object (T) in the contact item 325 from the contact list section 320. Alternatively, a telephone call may be established by activating a command object from one of the speed dial items 920 listed in the telephony section 330 of the dashboard 300. Telephone calls may also be established by invoking the dial window 930 through which phone numbers may be entered manually. Additionally, calls may be established between third parties through the dial window 930 by designating a "from" and "to" phone numbers. Once a telephone call has been established, a call monitor is displayed in the work space section 310, for example, that displays information about the call, such as the number connected to the call and the duration of the call. Accordingly, users can make calls, drop calls, track call duration, allow conferencing, and even record/play back calls and messages.

While the exemplary embodiments are described using telephone and IM as the main communication modes, other communication modes, such as email and video conferencing, may be integrated without departing from the scope of the present invention. In an alternative embodiment, the system and method in accordance with the present invention may be used as an integral tool for an enterprise's business continuity plan, such as the one described in co-pending application Ser. No. 11/025,694, filed Dec. 29, 2004, which is incorporated herein by reference in its entirety. By integrating all of the communication modes onto one system that is accessible from any where (e.g. via the Internet) using a non-proprietary application (e.g., web-browser), the system and method in accordance with the present invention allows an enterprise to continue operation of the business regardless of any loss in assets, such as employees, office locations, and the like. For example, the profiles of users who are considered critical to the operation of the enterprise may be designated as essential contact points in the enterprise database 210 and the relational database 180. By coupling these profiles with the entitlement server 230, a user's dashboard may be automatically be populated with these contacts upon login during an emergency, for example, so that each user will be able to know who to contact and how these people can be reached through the dashboard.

It will be apparent to those skilled in the art that various modifications and variations can be made in the system and method for an integrated communication framework of the present invention without departing from the spirit or scope of the invention. Thus, it is intended that the present invention cover the modifications and variations of this invention provided they come within the scope of the appended claims and their equivalents.

What is claimed is:

1. A system, comprising:
    one or more client devices, said client devices including an interface and a web-based internet connection; and
    a communication server including a web browser accessible interface module configured to be accessed by the one or more client devices through which one of the client devices connects to another client device via at least one of a plurality of first communication services connected to the communication server; the communication server including a persistent TCP connection to an enterprise server,
    wherein one of a plurality of second communication services in said enterprise server is telephony;
    wherein the communication server provides at least one of the one or more client devices with a user interface that displays a contact item that includes a profile of an owner and at least one command object that establishes a communication connection with the owner of the profile through one of the plurality of first communication services associated with the command object; and
    wherein the profile of the owner includes a public profile and a private profile,
    wherein the public profile is viewable by any client device and the private profile is viewable only with permission from the owner,
    wherein the private profile includes a corresponding command object that establishes a communication connection with the owner of the private profile through one of the plurality of communication services associated with the command object,
    wherein the command object is only displayed after permission is received from the owner of the private profile,
    wherein the user interface is automatically populated with a predetermined list of contact items upon login by a user of the user interface if an emergency event occurs,
    wherein the web browser accessible interface module integrates the plurality of first communication services and the plurality of second communication services onto a single web based platform accessible by one of the one or more client devices.

2. The system of claim 1, wherein the communication server includes a profile handler to manage profiles of users of the system.

3. The system of claim 1, wherein the communication server includes a contact list module to manage a list of one or more contact items associated with the user.

4. The system of claim 3, wherein the contact list module includes a search engine to search an electronic directory of users of the system.

5. The system of claim 3, wherein the communication server includes a workflow module to manage a work item created when a contact item containing a private profile is added to the contact list module.

6. The system of claim 5, wherein the work item is a request to an owner of the private profile associated with the contact item for access to the private profile.

7. The system of claim 1, wherein the telephony of one of a plurality of second communication services includes a speed dial module.

8. The system of claim 1, wherein the telephony of one of a plurality of second communication services includes a dial module to establish a telephonic connection among a plurality of telephone numbers.

9. The system of claim 1, wherein the communication server includes an instant messaging module.

10. A communication server, comprising:
    a contact list module, residing in one or more memory units, configured to manage a list of one or more contact items, one or more of the contact items each including a profile of an owner and at least one command object;
    a work flow module, residing in one or another of the one or more memory units, configured to generate a work item for display on a client device in web-based communication with said communication server;
    a connector to a telephony service to establish a telephonic connection; and
    a persistent TCP connector to an instant messaging service to establish an instant messaging session,
    wherein the command object is associated with one of the telephony service and the instant messaging service, the command object establishing a communication connection with the owner of the profile;
    wherein the communication server provides the client device with a user interface that displays one or more of the contact items; and
    wherein the profile of the owner includes a public profile and a private profile, wherein the public profile is viewable by any client device and the private profile is viewable only with permission from the owner,
    wherein the private profile includes a corresponding command object that establishes a communication connection with the owner of the private profile through one of the plurality of communication services associated with the command object, and
    wherein the command object is only displayed after permission is received from the owner of the private profile,
    wherein the user interface is automatically populated with a predetermined list of contact items upon login by a user of the user interface if an emergency event occurs,
    wherein the web browser accessible interface module integrates the telephony service and the instant messaging service onto a single web based platform accessible by the client device.

11. The communication server of claim 10, wherein the telephony service includes a speed dial module.

12. The communication server of claim 10, wherein the telephony service includes a dial module to establish a telephonic connection among a plurality of telephone numbers.

13. The communication server of claim 10, wherein the contact item includes instant messaging presence information.

14. The communication server of claim 10, wherein the contact list module further includes a search engine to search an electronic directory of users of the system.

15. The communication server of claim 10 further including a workflow module to manage a work item created when a contact item containing a private profile is added to the contact list module.

16. The communication server of claim 15, wherein the work item is a request to an owner of the private profile associated with the contact item for access to the private profile.

17. A method, comprising the steps of:
- establishing a connection between a client device and a communication module on a server;
- displaying a list of one or more contact items on a user interface, one or more of the contact items each including a profile of an owner and at least one command object, the command object being associated with one of a plurality of communication services including telephony;
- establishing a communication connection between the client device and the owner of the profile associated with one of the contact items through the communication service associated with the command object;
- generating a work item whenever a request to access a private portion of the profile is received; and
- displaying said work item on the profile owner's interface,
- wherein the profile of the owner includes a public profile and a private profile,
- wherein the public profile is viewable by any client device and the private profile is viewable only with permission from the owner,
- wherein the private profile includes a corresponding command object that establishes a communication connection with the owner of the private profile through one of the plurality of communication services associated with the command object, and
- wherein the command object is only displayed after permission is received from the owner of the private profile,
- wherein the user interface is automatically populated with a predetermined list of contact items upon login by a user of the user interface if an emergency event occurs,
- wherein a web browser accessible interface module integrates the plurality of communication services onto a single web based platform accessible by the client device.

18. The method of claim 17, further including the step of searching through an electronic directory of users.

19. The method of claim 17, further including the step of adding a contact item to the list of contact items.

20. The method of claim 19, wherein the step of adding the contact item includes generating a request for access to a private profile associated with the contact item.

21. A computer program product including a non-transitory computer readable medium having stored thereon computer executable instructions that, when executed by a general purpose computer, directs the computer to perform a method comprising the steps of:
- establishing a connection between a client device and a communication module on a server;
- displaying a list of one or more contact items on a user interface, one or more of the contact items each including a profile of an owner and at least one command object, the command object being associated with one of a plurality of communication services including telephony;
- establishing a communication connection between the client device and the owner of the profile associated with one of the contact items through the communication service associated with the command object;
- generating a work item whenever a request to access a private portion of the profile is received; and
- displaying said work item on the profile owner's interface;
- wherein the profile of the owner includes a public profile and a private profile,
- wherein the public profile is viewable by any client device and the private profile is viewable only with permission from the owner,
- wherein the private profile includes a corresponding command object that establishes a communication connection with the owner of the private profile through one of the plurality of communication services associated with the command object, and
- wherein the command object is only displayed after permission is received from the owner of the private profile,
- wherein the user interface is automatically populated with a predetermined list of contact items upon login by a user of the user interface if an emergency event occurs,
- wherein a web browser accessible interface module integrates the plurality of communication services onto a single web based platform accessible by the client device.

22. The computer program product of claim 21, further including the step of searching through an electronic directory of users.

23. The computer program product of claim 21, further including the step of adding a contact item to the list of contact items.

24. The computer program product of claim 23, wherein the step of adding the contact item includes generating a request for access to a private profile associated with the contact item.

* * * * *